(12) United States Patent
White et al.

(10) Patent No.: US 8,515,498 B2
(45) Date of Patent: Aug. 20, 2013

(54) FLIP MOBILE LIST TO TABLE

(75) Inventors: Brent-Kaan William White, San Francisco, CA (US); Anthony Chad Sampanes, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 384 days.

(21) Appl. No.: 12/392,915

(22) Filed: Feb. 25, 2009

(65) Prior Publication Data
US 2010/0218113 A1    Aug. 26, 2010

(51) Int. Cl.
*H04B 1/38*    (2006.01)

(52) U.S. Cl.
USPC .......................................... 455/566; 715/746

(58) Field of Classification Search
USPC .................. 455/566, 466, 557, 88; 715/746; 345/204, 173, 581
See application file for complete search history.

(56) References Cited

U.S. PATENT DOCUMENTS
2008/0122796 A1 *  5/2008  Jobs et al. ..................... 345/173
* cited by examiner

*Primary Examiner* — Charles N. Appiah
*Assistant Examiner* — Alexander Yi
(74) *Attorney, Agent, or Firm* — Marger Johnson & McCollom PC

(57) ABSTRACT

A method of presenting data on a mobile electronics device includes initiating an application on a mobile device, requesting data from a server separate from the mobile device, receiving data from the server, displaying the data on the mobile device in a first view, and displaying the data on the mobile device in a second view, upon detecting a change of orientation of the mobile device. A method of providing data to a mobile device includes receiving a request for data from a mobile device at a server, providing the data in at least a first view to a mobile device, and upon reception of a second request from the mobile device, providing the data in a second view. A method of presenting data on a mobile device includes initiating a database application on a mobile device, requesting data from a database server across a mobile network, receiving the data from the database server across the mobile network, displaying the data in a first view on the mobile device, and displaying the data on the mobile device in a second view upon receiving a signal from an orientation sensor in the mobile device indicating that the mobile device has changed orientation from a first orientation to a second orientation.

11 Claims, 4 Drawing Sheets

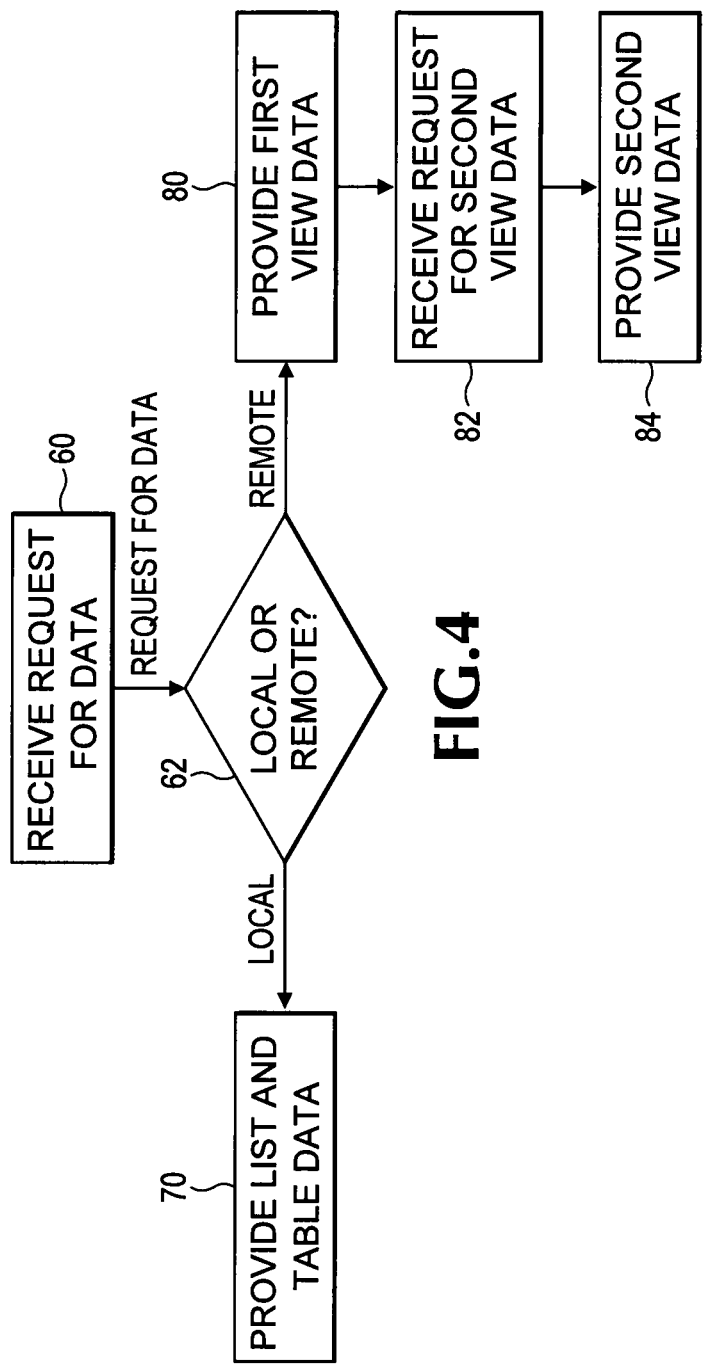

FLIP MOBILE LIST TO TABLE

BACKGROUND

To remain competitive, modern day enterprises need information systems that serve and adapt to their complex needs. Many businesses or enterprises use object-oriented databases to maintain and update information about business objects used in these information systems. Business objects represent real world things such as employees, products, invoices, or payments, as examples. These objects can become complex and have multiple attributes, or characteristics, that provide information about the object. The attributes of an object typically reside in a database table.

With the advent of relatively high-powered mobile devices, many users access the databases from these devices, even though the devices generally have a relatively small user interface area. In most current mobile user interfaces, lists are used to organize and display data. These lists are generally limited to one attribute for a typical object. However, the complexity of the business objects makes defining them by only one attribute inadequate. This also imposes a limitation on sorting, as the user can only sort by the attribute shown in the list.

One solution involves presenting a table on the user interface. Because of the size limitations, however, the user has to scroll extensively in the horizontal direction to view other portions of the table. Even further, the user cannot really see the whole table in the user interface, as the type is too small to see clearly. The ability to access a database by a mobile device is hampered by the size of the user interface or screen inherent in the devices.

BRIEF DESCRIPTION OF THE DRAWINGS

FIG. 4 shows a flowchart of an example of a computer-controlled method to display data on a mobile device.

DETAILED DESCRIPTION OF THE EMBODIMENTS

Many mobile devices, such as personal digital assistants (PDAs), cell phones, handheld computers, even portable entertainment devices such as handheld video games and digital audio players, have relatively high-powered computing abilities compared to similar devices available a few years ago. As business environments have become more mobile, users perform many different tasks on the mobile devices related using complex technologies, including running database applications from their mobile device and interacting with databases located on a server, either locally or remotely.

The terms 'locally' and 'remotely' may be misleading. In some views, a mobile device is always working 'remotely' in that it always interacts with servers through a mobile network. However, for purposes here 'locally' means that the user is working locally on that user's device separated from the main database, possibly with a light weight database running on the device. In this case, a user would work without a cellular or data network connection, transact on the data and still have available different presentations based on orientation. The device would then synch the data changes upon reconnecting to the database. The user is working remotely when using the device to operate on the main database from a remote location.

A mobile device may be working locally when it has a connection through a Wireless Fidelity (Wi-Fi) network on an organization's premises in addition to a connection through a cellular network, for example. A mobile device may be working remotely when it is operating at different premises and accessing the server through the cellular network, rather than having a local Wi-Fi connection. A device operating locally is assumed to have more bandwidth available to it, which affects how much data is sent to the device, as will be discussed in more detail later. These are merely examples and are not intended to limit the scope of the embodiments here.

Generally, database systems involve a three-tiered system. The database tier includes the database servers and the actual data upon which applications operate. The application tier, sometimes referred to as the business logic tier, performs detailed processing on the data. The client tier provides the user interface and generally communicates with the application tier to provide users with access to the data in answer to queries provided through the user interface.

Figure 1:
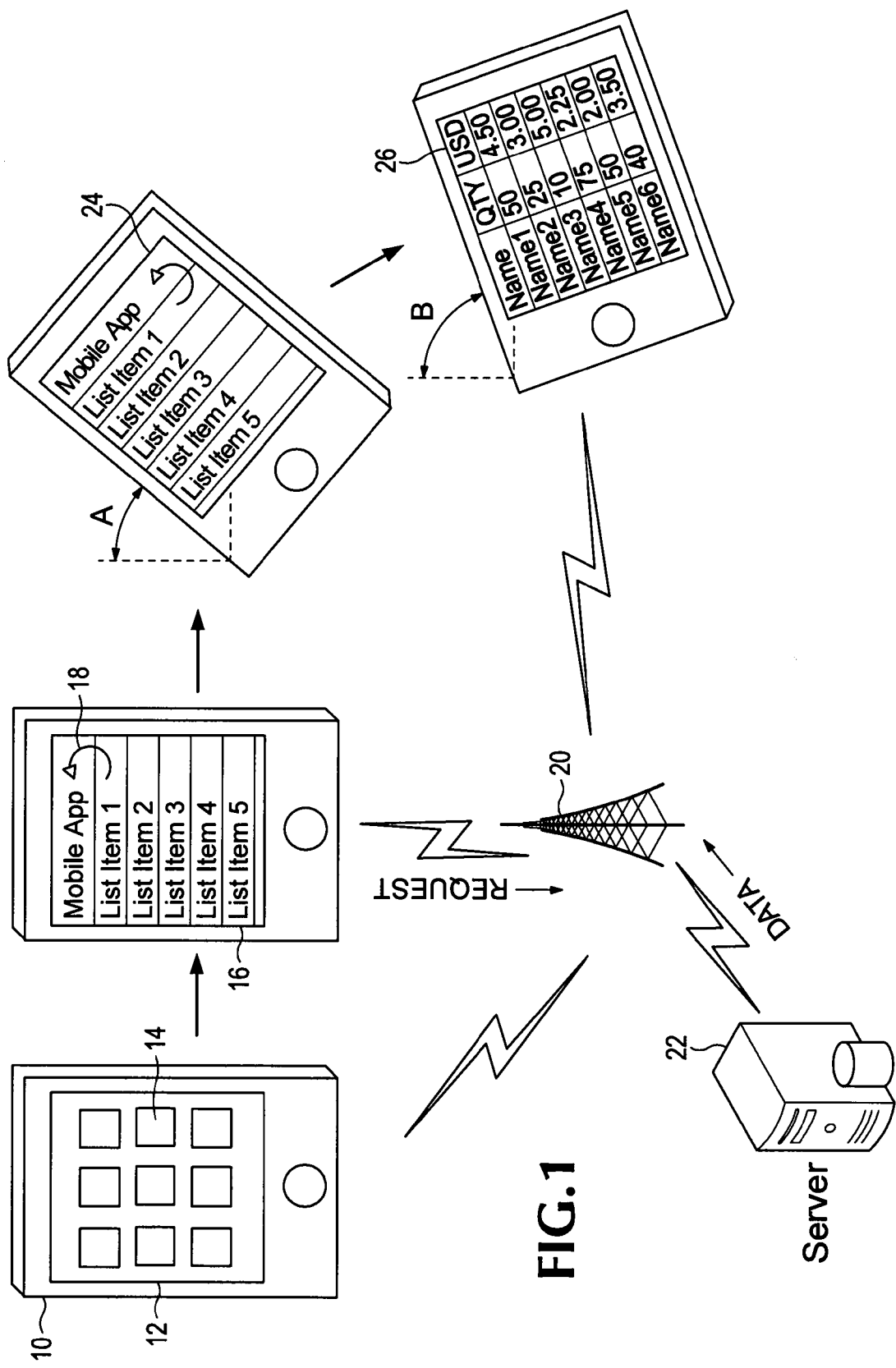
FIG. 1 shows an example of a mobile device having an orientation sensor in a local mode.

FIG. 1 shows a system in which a mobile device 10 is operating locally to a server 22. The mobile device 10 communicates through a mobile network 20 with a server 22. As discussed before, a local device is one that is operating 'near' or one station away from the server. The mobile device has a user interface 12, having a set of applications such as 14 available to the user. Upon selecting an application 14, the mobile device transmits a request to the server for the data related to the application. As will be discussed in more detail in FIG. 3, the request may be inherent upon launching of the application.

When in local mode, the request will include a request for both list and table data, more generally first view data and second view data. Alternatively, the server could make the determination as to whether the device is operating remotely or locally. One example would be for the server to analyze the packet headers to determine the routing of the packet prior to reaching the server. Regardless of how the determination is made, when the device is in local mode, the data received in response to the request includes both list and table data. For other applications, this may be thought of as data for both a first and second view.

Returning to FIG. 1, the list view is shown at 16, and an indicator of some sort such as 18 would also appear on the user interface. The indicator would inform the user of an alternative view available to the user. In response the user may 'flip' the device from 'landscape' to 'portrait' mode, where those terms refer to the orientation of the device similar to orientation of documents on a screen or paper. As can be seen at positions 24 and 26, the device in this example travels through an angle A at position 24 and completes the flip or rotation at position 26 at angle B, where angles A and B are relative to the first position shown at the far left of the figure.

The determination of what angle constitutes an orientation change is left up to the designer. Generally, mobile devices use some sort of orientation sensor, such as an accelerometer to detect a change in orientation or rotation of the device. Examples of these devices include, but are not limited to, the Apple® iPhone®, and the LG Dare®. The reformatting of data on the screen of most mobile devices with some sort of orientation sensor changes from portrait to landscape or the reverse when the device moves past 45 degrees from its initial position. For purposes of discussion here, this is the angle that will be used, with the understanding that it could be programmable to any angle desired by the designer.

In the example of FIG. 1, the position 24 is at 30 degrees from vertical, which is why no change from the first view to the second view has occurred. Position 26 is at 60 degrees from vertical, so the view has changed from a first view to the second view. The 'portrait' position may be referred to as the vertical orientation and the 'landscape' position may be referred to as the horizontal orientation.

As shown in FIG. 1, while operating in the local mode the request and resulting data provided may include both the list and table view. No further requests to the server generally occur in local mode. This is in contrast to remote mode, shown by FIG. 2.

Figure 2:
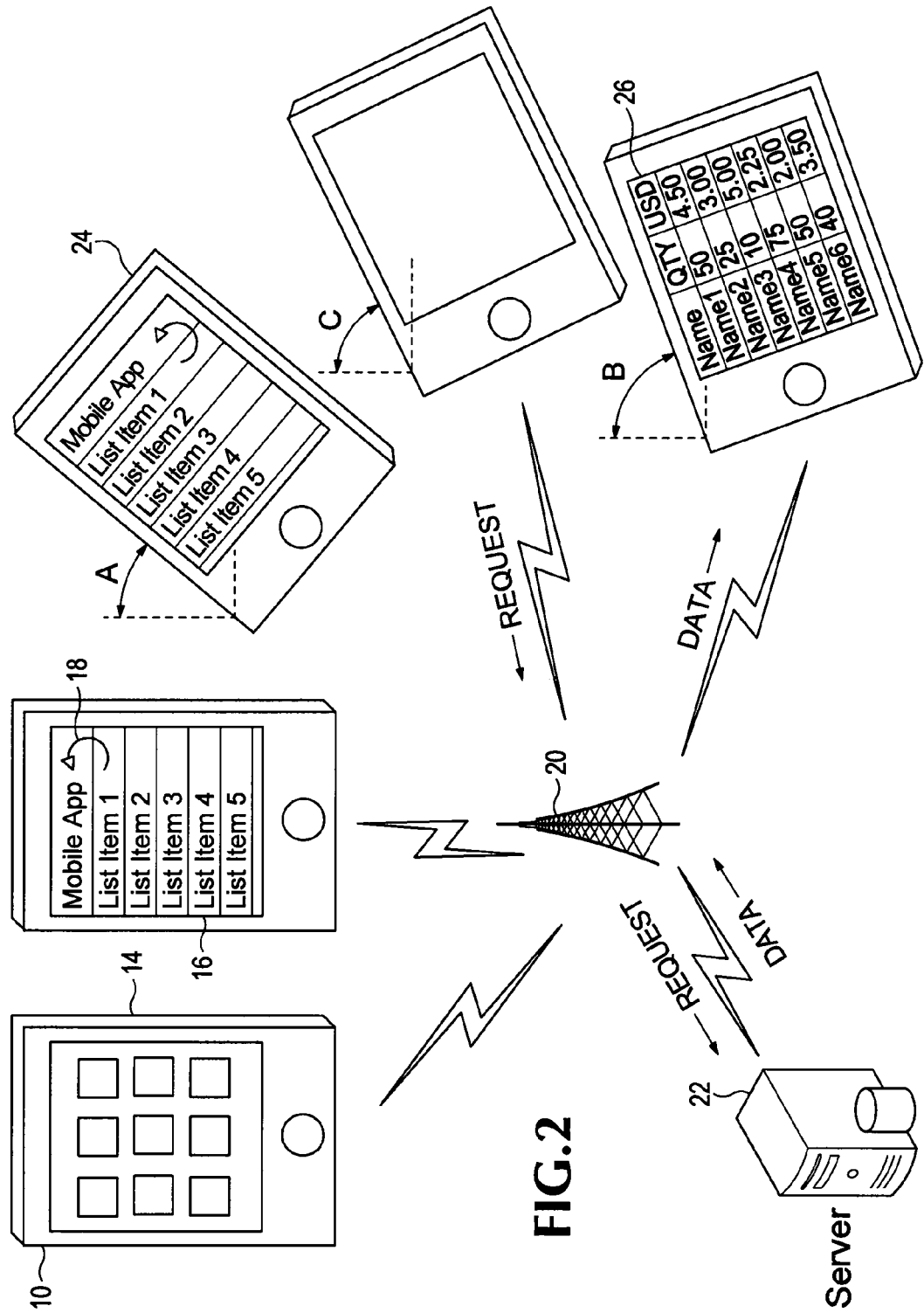
FIG. 2 shows an example of a mobile device having an orientation sensor in a remote mode.

In FIG. 2, the mobile device 10 is operating in remote mode, where there is some network distance from the server 22, where the device is operating in a different domain or network than the server. The user selects the application 14 and the device requests the data from the server, but only receives the list data, or data of a first view, which is shown at 16. Again, the task of determining remote or local may be accomplished by the server instead of the device.

The user may see the indicator 18 that there is another view available and would know to flip the device to its horizontal orientation to see the alternative view. The device travels through the necessary angle to trigger an orientation change signal from an orientation sensor, such as when the device flips through angle A to complete the flip at angle B. Once the device travels through the angle C, a request is transmitted to the server requesting the table data. In this example, angle C is 46 degrees, or just past the triggering angle of 45 degrees.

The orientation change signal in the remote mode does not just result in the displaying of the table view, it may generate a command to request and receive the table view data. The initial request in the remote mode does not include the table data. The second request for the table data is transmitted from the device to the server and the data is returned. When the device completes the flip at 26, angle B, the table data is now present and displayed to the user.

It must be noted that the discussion of FIGS. 1 and 2 have shown and been limited to an orientation change from vertical to horizontal and from a list view to a table view. The application of the invention is not limited to this one directional change. The change could just as easily occur from a horizontal view to a vertical view. If the device submits the initial request in the horizontal orientation, the initial view may be the table view and the flip to vertical may result in the view switching to a list view.

For that reason, the device may be referred to as being in a first position or orientation and the data being in a first view. The device then flips or changes orientation to a second position and the data would be in a second view. There is no limitation inherent in the invention as claimed as to which orientation is the first or second orientation. It would more than likely be more common for a user to flip from the list view to the table view, as most devices having orientation sensors have their user interfaces, including the buttons, oriented in the vertical mode. However, there is no limitation to devices oriented to the horizontal either.

Figure 3:
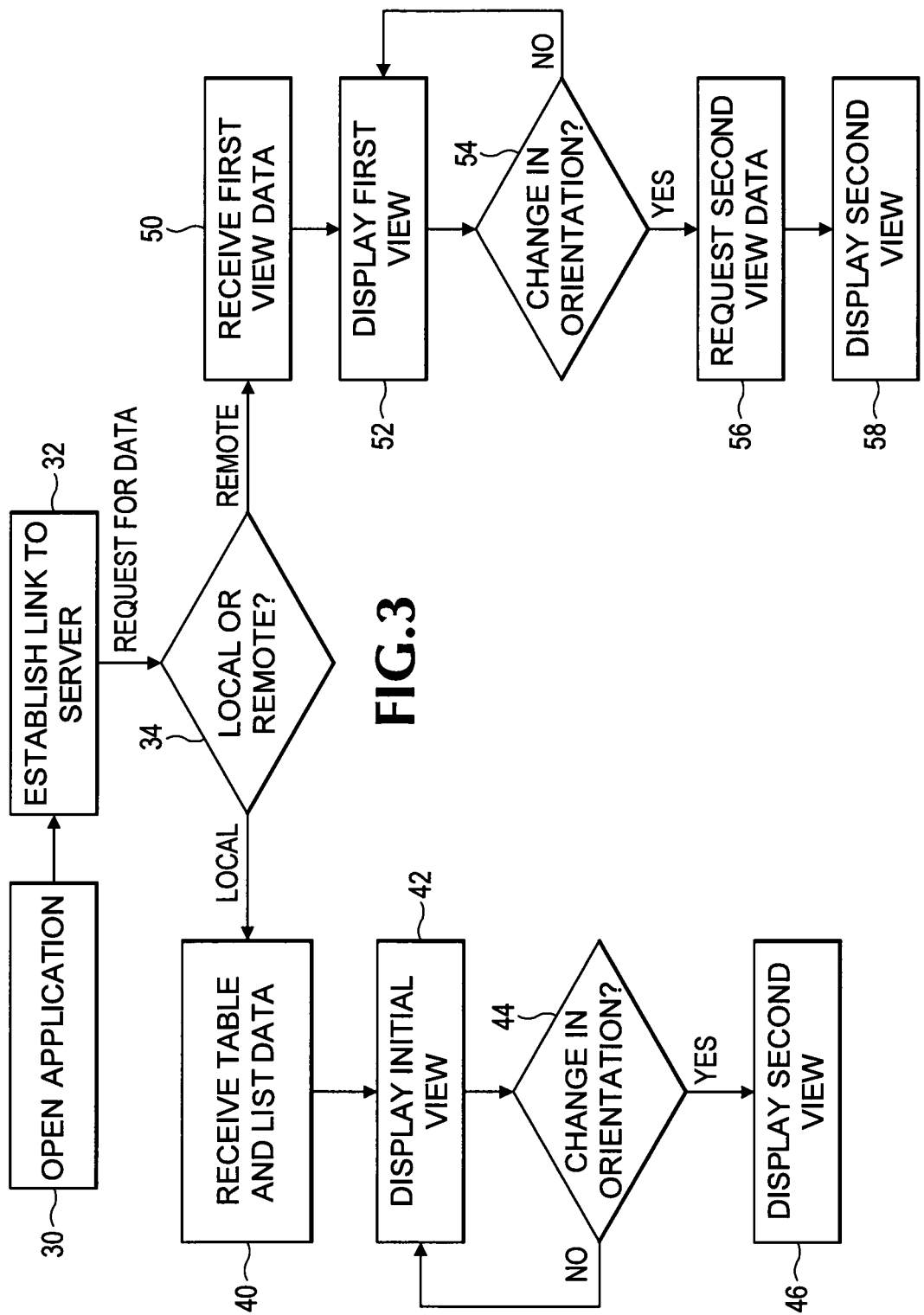
FIG. 3 shows a flowchart of an example of a computer-controlled method to provide data to a mobile device.

FIG. 3 shows a flowchart of an example of a process for requesting and displaying data on a mobile device. The mobile device, typically on an input from a user, opens the application at 30. Generally, the applications being discussed here are database applications, but other applications may also be used within the scope of the invention. The device establishes a link to the server for the application at 32 if necessary. The device may have a pre-existing link to the appropriate server, so process 32 may be optional.

At 34, the device identifies whether it is local or remote. This may not be an explicit process, but may be implicit in the way the request is phrased. For example, a typical data request from a local device may not need to identify the device as remote or local, it would be inherent in the request. An example is shown below:

(getList);
(getTable).

The request itself may not be explicit. It may occur upon the launching of the application, where the list and table layout data is provided upon initial download to the device that occurs after launching the application. The mobile device receives the list and table data at 40.

The process then displays the first view at 42. As discussed above, this view will more than likely be the list view, but the table view would also be possible. This view remains in effect until an orientation change is detected at 44. When the orientation change is detected at 44, the second view, typically the table view, would be displayed at 46. This process could then alternate between the two views as needed depending upon orientation changes in the local mode.

Returning to decision 34, the device may be in remote mode and the process would progress to 50. The device would receive the first view data, typically the list data, at 50. The device would then display the first view, depending upon the first view of the data. This view remains in effect until an orientation change is detected at 54.

Upon detection of an orientation change at 54, the second view data is requested. As discussed, this is typically the table data. Upon receiving the second view data, it is displayed as a second view at 58. It would be beneficial if the request were transmitted at the point when the device first passes the threshold angle that indicates an orientation change so that when the device completes its flip, the data in the alternative view is presented. In this manner the device acquires and presents the data to the viewer depending upon the orientation of the device. Once the necessary data is present on the device, the user would be able to flip back and forth between the orientations as desired with no further requests to the server.

FIG. 4 shows a flowchart of an example of a process of providing data to a mobile device, depending upon the device operating mode and orientation. The server receives the request for data at 60. At 62 a determination is made, either by the server making the determination or being informed by the device, as to whether the device is local or remote. If the device is local, the list and table data are provided in one response at 70.

If the device is remote, the data is provided in a first view at 80. Upon an orientation change, which will typically be transparent to the server, a request for the second view data will occur at 82. This data is then provided at 84. Once both data requests have been satisfied by the server, no further interaction between the mobile device and the server would seem necessary.

As discussed above, the actual angle that must be exceeded to define an orientation change is left to the designer. This discussion has been using 45 degrees. When the device is operating, there is a process running that detects an orientation change and changes the view. An example of such a process is shown below:

Function CheckDegree ( )
If Orientation<45° (showList);
If Orientation>45° (showTable);

In this manner, a user can more effectively utilize the capabilities of a mobile device having an orientation sensor and the ability to change from a portrait to landscape mode.

The data displayed actually changes depending upon the orientation, unlike typical user interfaces where the data remains the same, it is just presented in a wider view.

Thus, although there has been described to this point a particular embodiment of a computer-controlled method and system to change a database view on a mobile device, it is not intended that such specific references be considered as limitations upon the scope of this invention except in-so-far as set forth in the following claims.

What is claimed is:

1. A computer-controlled method of presenting data on a mobile electronics device, comprising: initiating a database application on a mobile device; requesting data comprising multiple items from a database server separate from the mobile device; receiving the data from the database server; displaying the data on the mobile device in a first view in a vertical or a horizontal orientation; and upon detecting a change of orientation of the mobile device from one of less than 45 degrees or greater than 45 degrees to the other orientation, displaying the data on the mobile device in a second view in a vertical or a horizontal orientation different from that of the first view, wherein one of either the first view or the second view is an item list view of a vertically oriented lined table showing the multiple items listed by one attribute and the other view is a horizontally oriented lined table view of the table showing the multiple items listed by multiple attributes containing more extensive information of the item list view, wherein both the first and the second views are from a database accessed by the database application.

2. The computer-controlled method of claim 1, wherein initiating the application comprises initiating the application locally.

3. The computer-controlled method of claim 1, wherein initiating the application comprises initiating the application remotely.

4. The computer-controlled method of claim 3, wherein requesting data comprises requesting data for a first view.

5. The computer-controlled method of claim 4, wherein displaying the data on the mobile device comprises:
   requesting second view data from the server, upon detecting the change of orientation; and
   displaying the second view data on the mobile device.

6. The computer-controlled method of claim 1, wherein displaying the data in the first view comprises displaying data in a list view, and displaying data in the second view comprises displaying data in a table view.

7. The computer-controlled method of claim 1, wherein displaying the data in the first view comprises displaying the data in a table view, and displaying the data in the second view comprises displaying data in a list view.

8. A computer-controlled method of presenting data on a mobile device, comprising: initiating a database application on a mobile device; requesting data from a database server across a mobile network; receiving the data from the database server across the mobile network; displaying the data in a first view on the mobile device, wherein the first view shows one of either an item list view of a lined table or a lined table view of the table, in a database residing on the database, wherein the list view shows multiple items listed by the one attribute in a vertically oriented screen and the table view shows the multiple items listed by multiple attributes containing more extensive information of the item list view in a horizontally oriented screen; and displaying the data on the mobile device in a second view upon receiving a signal from an orientation sensor in the mobile device indicating that the mobile device has changed orientation from one of less than 45 degrees or greater than 45 degrees to the other orientation, wherein the second view shows the other of the list view or the table view not shown in the first view.

9. The computer-controlled method of claim 8, wherein initiating a database application comprises initiating a database application locally.

10. The computer-controlled method of claim 8, wherein initiating a database application comprises initiating a database application remotely.

11. The computer-controlled method of claim 8, wherein receiving the data comprises receiving the data in first view, and upon receiving a signal from the orientation sensor:
   requesting second view data from the database server;
   receiving second view data from the database server; and
   displaying the second view data on the mobile device in the second orientation.

* * * * *